United States Patent Office 2,878,576
Patented Mar. 24, 1959

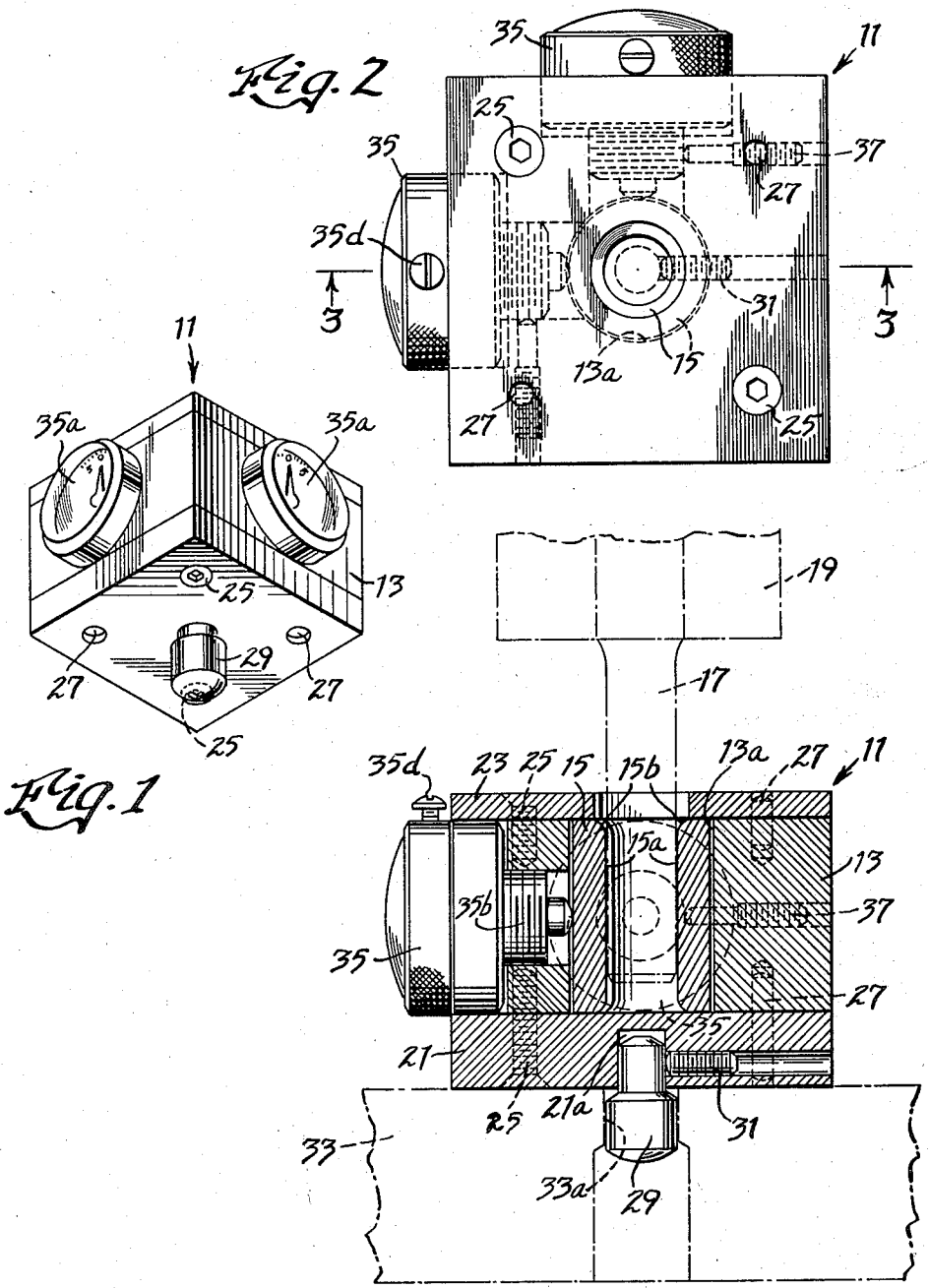

2,878,576

ADJUSTABLE GAGE FOR EQUALIZING CLEARANCE BETWEEN PUNCHES AND DIES FOR ACCURATE ALINEMENT

Clayton V. Cramb, Nashville, Tenn.

Application April 30, 1958, Serial No. 731,909

7 Claims. (Cl. 33—185)

This invention relates to an adjustable gage for equalizing clearance between punches and dies for accurate alinement.

More particularly the invention pertains to a gage for equalizing clearance in the accurate alining of punches and dies, said gage comprising a body having an accurately finished bottom surface for lying upon a die block, said surface presenting a socket for receiving the shanks of locating pilot pins ground to fit holes of various sizes in die blocks, said body having a pocket in alinement with said locating pin, removable accurately machined sleeves selectively loosely insertable into said pocket, said sleeves having the same outside diameters but various inside diameters corresponding to diameters of die punches, and a pair of dial-type indicators disposed at right angles about said sleeve to indicate its position relative to said locating pin and thereby the position of the sleeve-positioning die punch relative to the pin-locating die hole.

Accurate-clearance alinement of die punches and dieblock holes has heretofore been a tedious time-consuming and too often an insufficiently accurate procedure involving difficult eye alining and laborious use of feeler gages. The problem is further complicated by the wide variation of clearances due to variations in types and thickness of materials. The present invention greatly reduces the time required while at the same time greatly increasing the accuracy of the alining operation.

In the drawings:

Fig. 1 is a perspective view, from below, of a preferred embodiment of the invention.

Fig. 2 is a plan view of the gage.

Fig. 3 is an elevational view of the gage in section taken on line 3—3 of Fig. 2.

With reference now to the drawings, the numeral 11 generally designates the gage. Gage 11 comprises a body block 13 of any suitable material such as a steel having good constant-dimension characteristics. Block 13 has a centrally located vertical-axis pocket 13a for somewhat loosely receiving therein one of a plurality of punchreceiving sleeves 15, each having the same accurately machined outside diameter but different inside diameters to receive die punches 17, of various sizes, in their axial bores 15a. Bores 15a are flared at 15b to help guide the punches 17 thereinto. Punches 17 are adjustably mounted in conventional punch retainers 19.

Pocket 13a is defined by the bottom plate 21 and the top plate 23 either or both of which may be made easily removable to facilitate interchange of sleeves 15. Each of plates 21 and 23 is attached to body 13 by countersunk screws 25, and at least the bottom plate is accurately located relative to the body 13 by the use of dowel pins 27 and alined sockets in the joined parts.

Upper plate 23 is centrally apertured to permit the punch 17 to enter the sleeve 15, the aperture being as large as possible consistent with retention thereby of the sleeve 17 loosely in pocket 13a. Lower plate 21 has a vertical-axis socket 21a formed therein to revive the shanks of interchangeable pilot pins 29 which are held therein in accurate axial alinement with the pocket 13a. A set screw 31 anchors pin 29 in its socket.

When the gage 11 rests upon a die block 33 and a pilot pin 29 ground to fit die hole 33a is in place therein as shown in Fig. 3, the sleeve 15 would be in axial alinement with the axis of hole 33a when said sleeve is in its zero-deviation position as indicated by zero readings on the dials 35a of the indicators 35. Indicators 35 may be of any desired accuracy and sensitivity (reading for example in thousandths or ten-thousandths of an inch).

Indicators 35 are shown herein as partly housed in recesses in body 13, their threaded hubs 35b being grossly adjustably screwed into reduced-cross-section bores in the block 13, and held in position therein by set screws 37. Each indicator 35 has a feeler button 35c engageable by the sleeve 15, as shown. Each indicator 35 also has a vernier adjustment screw 35d to zero-in the indicator when the sleeve 15 is perfectly alined with the axis of pin socket 21a.

With the parts in positions as shown in Fig. 3, any deviation of the axis of punch 17 from the axis of dieblock hole 33a causes sleeve 15 to move way from the latter axis thus producing a plus or minus deviation reading on one or both of the dials 35a. Punch 17 is then easily and quickly adjusted in retainer 19 until zero readings are obtained, at which time the punch is accurately clearance-alined with the die block hole 33a.

While I have disclosed a preferred embodiment of my invention, it is to be understood that many changes can be made in the size, shape, composition and arrangement of the invention without departing from the spirit of the invention as defined by the subjoined claims.

Having thus described my invention, I claim:

1. A gage for easily, quickly and accurately clearancealining die punches and block holes, comprising: a body defining a punch-receiving region, at least one indicator supported by said body and disposed about the axis of punches to be received in said region, said indicator having means engageable with said punches to indicate displacements of their axes from a predetermined zerodeviation axis, and a pilot pin attached to said body for alining the zero-deviation axis of said body with a die block hole, whereby a said punch will be alined with said hole by adjustment of the punch to produce a zerodeviation reading on said indicator.

2. A gage according to claim 1, and additionally comprising a second gage indicator widely angularly spaced from said first-mentioned gage indicator about the axis of said punches.

3. A gage according to claim 2, the angular spacing being of the order of ninety degrees.

4. A gage according to claim 1, said indicator being adjustable for zeroing-in about the axis of said punches.

5. A gage according to claim 1 and additionally comprising interchangeable sleeves receivable in said zone and movable to engage said indicator in response to displacement by punches accurately and closely engageable within the bores of said sleeves.

6. A gage according to claim 5, said sleeves having flared ends formed in the bores thereof for facilitating entrance of the punches thereinto.

7. A gage according to claim 1, said pilot pin being easily removable for replacement by other pilot pins of various diameters for adapting said gage to die holes of various diameters.

References Cited in the file of this patent

UNITED STATES PATENTS

| 2,147,655 | Kratchman | Feb. 21, 1939 |
| 2,739,389 | Carter | Mar. 27, 1956 |
| 2,825,143 | Polirka | Mar. 4, 1958 |
| 2,830,377 | Wenz | Apr. 15, 1958 |